March 17, 1931.  G. FRANK  1,797,083
SAFETY DEVICE
Filed April 6, 1929
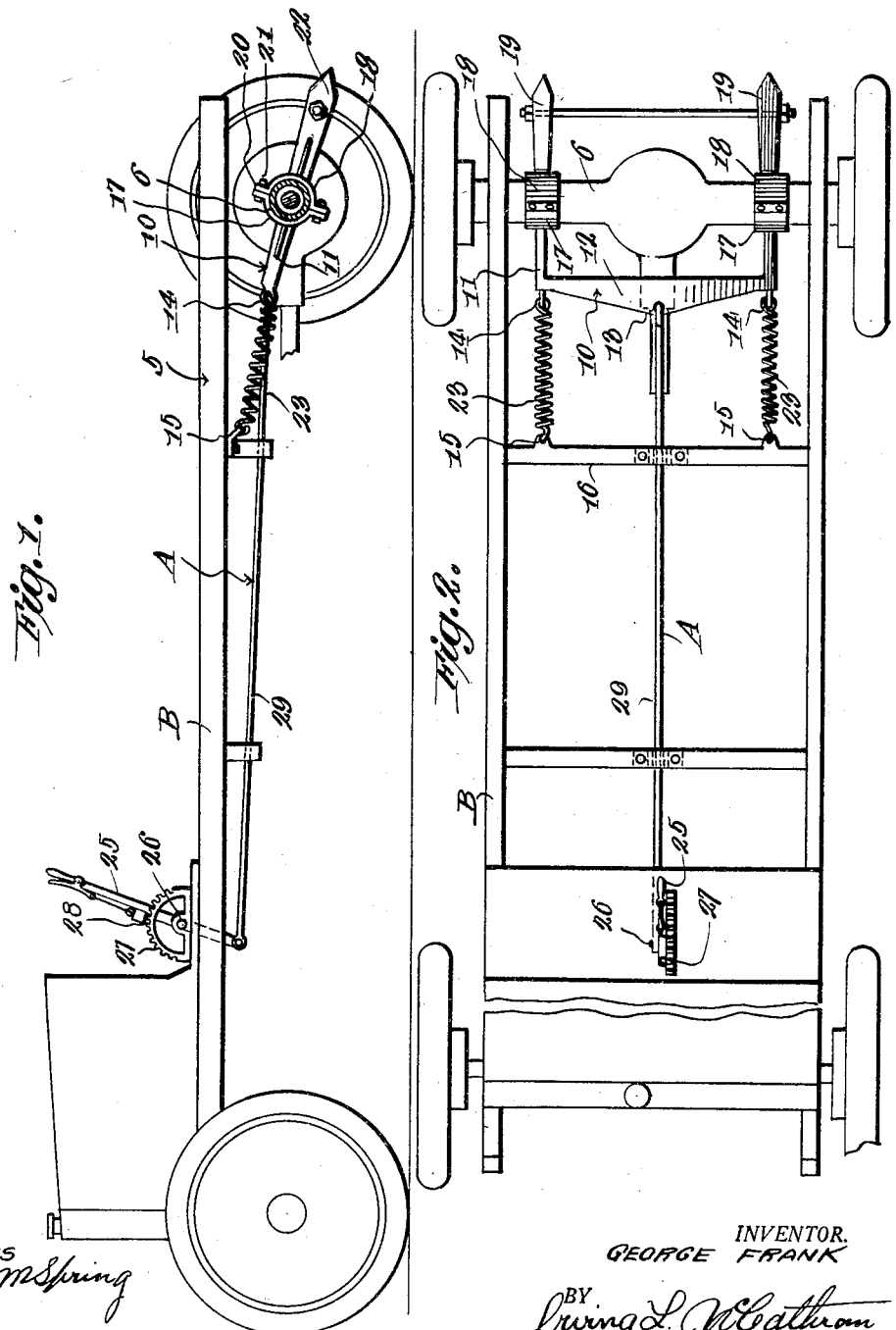
INVENTOR.
GEORGE FRANK Patented Mar. 17, 1931　　　　　　　　　　　　　　　　1,797,083

UNITED STATES PATENT OFFICE

GEORGE FRANK, OF OSWEGO, ILLINOIS

SAFETY DEVICE

Application filed April 6, 1929. Serial No. 353,031.

This invention appertains to attachments for motor vehicles and has for one of its primary objects to provide novel means associated with a conventional automobile for preventing the skidding of the same on wet, icy, or snowy pavements or roads, the means being normally disposed in an inoperative position and capable of being brought into instant use when necessary or advisable.
Another object of my invention is the provision of a device rockably carried by the rear axle housing of a motor vehicle, said device including a pair of prongs or shoes for engaging the roadway in case the vehicle starts to skid or slip, said prongs or shoes being normally held in an inoperative raised position to permit the free normal use of the vehicle, with novel means arranged adjacent to the driver's seat for moving the shoes or prongs into an operative ground-engaging position.

Another object of my invention is the provision of means capable of being brought into and out of active use from the driver's seat of a motor vehicle for engaging the ground, which device can function to hold a vehicle against backward movement on a hillside or the like.

A still further object of my invention is to provide a novel anti-skidding attachment for automobiles of the above character, which will be durable and efficient in use, one that will be simple and easy to manufacture and one which can be placed upon the market and incorporated with a conventional automobile at a low cost and without any change in the present construction thereof.

With these and other objects in view, the invention consists in the novel construction, arrangement and formation of parts, as will be hereinafter more specifically described, claimed, and illustrated in the accompanying drawing, in which drawing:

Figure 1 is a fragmentary side elevation of a motor vehicle showing parts thereof broken away and in section and illustrating my improved anti-skidding device incorporated therewith;

Figure 2 is a top plan view of the chassis of a motor vehicle showing my improved attachment incorporated therewith.

Referring to the drawings in detail, wherein similar reference characters designate corresponding parts throughout the several views the letter A generally indicates my improved device and B an automobile with which the same can be incorporated.

The automobile B can be of any conventional construction or type either of the pleasure or truck type and includes the usual chassis 5 having the rear axle housing 6.

My improved attachment A comprises a substantially U-shaped yoke 10 including the arms 11 and the connecting cross bar 12 which is provided at a point equi-distant its ends with an eye or opening 13 for a purpose which will be later described. The yoke 10 adjacent to its opposite ends is provided with eyes 14 which are in alinement with eyes 15 carried by one transverse brace 16 of the chassis. The rear ends of the arms 11 carry semicircular bearing collars 17 and similar semicircular bearing collars 18 are formed on the inner ends of anti-skidding arms 19 and the collars 17 and 18 are provided with mating ears 20 which are bolted together as at 21. The anti-skidding arms 19 extend rearwardly from the axle housing 6 as shown and it can be seen that the yoke 10 and said anti-skidding arms 19 can rotate on the axle housing 6 as a unit. The lower terminals of the anti-skidding arms 19 can be provided with any preferred type of anti-skidding shoes, prongs or the like, and in the present instance I have shown the lower terminals of the arms provided with pointed heads 22 for bearing against the ground or digging into ice or snow.

The yoke and the anti-skidding arms are normally controlled by contractile coil springs 23 which are connected respectively to the eyes 14 and 15 and these springs normally function to hold the anti-skidding arms in a raised position and the heads 22 thereof from out of engagement with the ground.

I provide novel means for rocking the arms and the yoke on the rear axle housing when it is necessary or desirable for bringing the heads 22 into engagement with the ground and this means embodies an operating lever 25 arranged adjacent to the driver's seat and preferably is located near the emergency or hand brake and in fact I may be able to use the hand brake lever for operating my device.

The lever 25 is rockably mounted at a point intermediate its ends, as at 26, by a suitable quadrant 27 and the lever is held in adjusted position on said quadrant by the use of a hand grip manipulated dog 28 which is adapted to engage the teeth of the quadrant. The lower end of the lever 25 has pivotally connected thereto the rearwardly extending operating rod 29 which has its rear end rockably and slidably connected to the eye or opening 13 in the yoke 10.

It is obvious from this construction that upon a suitable manipulation of the lever 25 and upon rearward movement of the rod 29, the yoke and the anti-skidding arms will be operated and the heads 22 of said arms will be brought into engagement with the ground or icy surface. These heads located adjacent to the opposite sides of the vehicle at the rear end thereof will effectively bite into the ground or icy surface and thus effectively prevent skidding of the rear end of the vehicle on icy, snowy or wet pavements and the device is particularly adaptable to be brought into play when it is necessary to suddenly apply the brakes.

It is obvious that when the lever 25 is released the springs 23 will function to return the anti-skidding arms and the yoke 10 to their normal positions.

The device can also be brought into play when the vehicle is parked on a hillside or the like so as to prevent the vehicle from rolling backward down the hill.

Changes in details may be made without departing from the spirit or the scope of this invention, but:

What I claim as new is:

1. The combination with an automobile including a chassis having transverse braces, and a rear axle housing, of a safety attachment therefor comprising a yoke and anti-skidding arms connected with the yoke, the yoke and anti-skidding arms being rockably mounted on said rear axle housing, pronged heads on said arms, a hand lever arranged adjacent to the forward end of the chassis mounted for rocking movement, a rod connecting the lower end of said lever to the central portion of the yoke, guides carried by the transverse braces receiving the rod, eyes carried by the rearmost transverse brace on opposite sides of the guide for the rod carried thereby, eyes on the yoke on opposite sides of the point of connection of the rod therewith, and contractile coil springs connected to the eyes of the transverse brace and to the eyes of the yoke normally holding the arms in a raised position.

In testimony whereof I affix my signature.

GEORGE FRANK.